(12) United States Patent
Suh et al.

(10) Patent No.: US 7,733,756 B2
(45) Date of Patent: *Jun. 8, 2010

(54) RECORDING MEDIUM WITH OPTIONAL INFORMATION AND APPARATUS AND METHODS FOR FORMING, RECORDING, REPRODUCING AND CONTROLLING REPRODUCTION OF THE RECORDING MEDIUM

(75) Inventors: Sang Woon Suh, Seoul (KR); Jin Yong Kim, Kyunggi-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/222,445

(22) Filed: Aug. 8, 2008

(65) Prior Publication Data

US 2009/0052314 A1 Feb. 26, 2009

Related U.S. Application Data

(63) Continuation of application No. 10/762,535, filed on Jan. 23, 2004.

(30) Foreign Application Priority Data

| Jan. 23, 2003 | (KR) | .................. 10-2003-0004488 |
| Feb. 10, 2003 | (KR) | .................. 10-2003-0008317 |

(51) Int. Cl.
*G11B 7/00* (2006.01)

(52) U.S. Cl. .............. 369/59.25; 369/275.3; 369/275.4; 369/47.27

(58) Field of Classification Search ........................ None
See application file for complete search history.

(56) References Cited

U.S. PATENT DOCUMENTS

| 4,879,707 | A | 11/1989 | Getreuer et al. |
| 5,295,127 | A | 3/1994 | Verboom et al. |
| 5,572,507 | A | 11/1996 | Ozaki et al. |
| 5,689,486 | A | 11/1997 | Shimizu et al. |
| 5,703,859 | A | 12/1997 | Tahara et al. |
| 5,706,268 | A | 1/1998 | Horimai |

(Continued)

FOREIGN PATENT DOCUMENTS

| CN | 1152170 | 6/1997 |

(Continued)

OTHER PUBLICATIONS

Office Action issued Dec. 19, 2008 by the Chinese Patent Office in Chinese Patent Application No. 200480000399.8 (with English language translation).

(Continued)

*Primary Examiner*—Wayne R Young
*Assistant Examiner*—Adam R Giesy
(74) *Attorney, Agent, or Firm*—Harness, Dickey & Pierce, P.L.C.

(57) ABSTRACT

A recording medium, such as a high-density and/or read-only recording medium, such as BD-ROM, which includes an identification information, which can identify whether optional information, such as copy protection information, is needed or not for the playback of contents stored on the recording medium, and to methods and apparatuses for forming, recording, and reproducing data on the recording medium.

21 Claims, 6 Drawing Sheets

U.S. PATENT DOCUMENTS

| | | | |
|---|---|---|---|
| 5,737,286 A | 4/1998 | Timmermans et al. | |
| 5,799,501 A | 9/1998 | Leonard et al. | |
| 5,809,006 A | 9/1998 | Davis et al. | |
| 5,818,805 A | 10/1998 | Kobayashi et al. | |
| 5,848,050 A | 12/1998 | Nagasawa et al. | |
| 5,878,007 A | 3/1999 | Matsumoto et al. | |
| 5,892,797 A | 4/1999 | Deng | |
| 5,894,463 A | 4/1999 | Okawa et al. | |
| 6,021,199 A | 2/2000 | Ishibashi | |
| 6,031,815 A | 2/2000 | Heemskerk | |
| 6,223,247 B1 | 4/2001 | Otsuka et al. | |
| 6,223,285 B1 | 4/2001 | Komuro et al. | |
| 6,289,102 B1 | 9/2001 | Ueda et al. | |
| 6,353,890 B1 | 3/2002 | Newman | |
| 6,516,064 B1 | 2/2003 | Osawa et al. | |
| 6,519,213 B1 | 2/2003 | Song et al. | |
| 6,538,982 B1 | 3/2003 | Van Vlerken et al. | |
| 6,549,495 B1* | 4/2003 | Spruit et al. | 369/47.19 |
| 6,550,009 B1 | 4/2003 | Uranaka et al. | |
| 6,664,526 B2 | 12/2003 | Yokoi | |
| 6,708,299 B1 | 3/2004 | Xie | |
| 6,885,629 B2* | 4/2005 | Oshima et al. | 369/275.3 |
| 6,930,977 B1* | 8/2005 | Kondo et al. | 369/275.4 |
| 6,938,162 B1 | 8/2005 | Nagai et al. | |
| 7,248,558 B2 | 7/2007 | Kobayashi et al. | |
| 7,266,074 B2 | 9/2007 | Kim et al. | |
| 2001/0036132 A1 | 11/2001 | Kobayashi et al. | |
| 2002/0041686 A1 | 4/2002 | Moriyama et al. | |
| 2002/0048241 A1 | 4/2002 | Kumagai et al. | |
| 2002/0076047 A1 | 6/2002 | Ando et al. | |
| 2002/0089920 A1* | 7/2002 | Gotoh et al. | 369/275.3 |
| 2002/0097871 A1 | 7/2002 | Gotoh et al. | |
| 2002/0144114 A1 | 10/2002 | Barnard et al. | |
| 2002/0181358 A1 | 12/2002 | Sako | |
| 2003/0007432 A1* | 1/2003 | Minamino et al. | 369/47.21 |
| 2003/0012375 A1 | 1/2003 | Sako et al. | |
| 2003/0053404 A1* | 3/2003 | Kondo | 369/275.4 |
| 2003/0117920 A1 | 6/2003 | Sako et al. | |
| 2003/0174605 A1 | 9/2003 | Sako et al. | |
| 2003/0185128 A1 | 10/2003 | Shoji et al. | |
| 2004/0076110 A1 | 4/2004 | Hino et al. | |
| 2004/0120247 A1* | 6/2004 | Lee et al. | 369/275.3 |
| 2004/0151091 A1* | 8/2004 | Ma et al. | 369/47.22 |
| 2005/0018555 A1 | 1/2005 | Sabi et al. | |
| 2005/0099916 A1* | 5/2005 | Jeon et al. | 369/47.54 |
| 2005/0122889 A1 | 6/2005 | Kobayashi et al. | |

FOREIGN PATENT DOCUMENTS

| | | |
|---|---|---|
| CN | 1293810 A | 5/2001 |
| CN | 1362707 | 8/2002 |
| EP | 0 299 573 | 1/1989 |
| EP | 0 545 472 | 6/1993 |
| EP | 0723216 | 7/1996 |
| EP | 0756279 | 1/1997 |
| EP | 0 807 929 | 11/1997 |
| EP | 0 898 271 A2 | 2/1999 |
| EP | 0 936 610 | 8/1999 |
| EP | 0997899 | 5/2000 |
| EP | 1 028 423 | 8/2000 |
| EP | 1 058 254 | 12/2000 |
| EP | 1 067 540 | 1/2001 |
| EP | 1 122 729 | 8/2001 |
| EP | 1152412 | 11/2001 |
| EP | 1 168 312 | 1/2002 |
| EP | 1168328 | 1/2002 |
| EP | 1 229 537 | 8/2002 |
| JP | 05-036194 | 2/1993 |
| JP | 05-325193 | 12/1993 |
| JP | 07-272282 | 10/1995 |
| JP | 8-124171 | 5/1996 |
| JP | 08-147704 | 6/1996 |
| JP | 09-081938 | 3/1997 |
| JP | 09081938 A * | 3/1997 |
| JP | 9-128874 | 5/1997 |
| JP | 10-003746 | 1/1998 |
| JP | 10-172149 | 6/1998 |
| JP | 10-269577 | 10/1998 |
| JP | 11-066739 A | 3/1999 |
| JP | 11-086436 | 3/1999 |
| JP | 11-261950 | 9/1999 |
| JP | 11-317002 | 11/1999 |
| JP | 2000-149415 | 5/2000 |
| JP | 2000-195049 | 7/2000 |
| JP | 2000-195094 | 7/2000 |
| JP | 2000-231722 | 8/2000 |
| JP | 2000-298941 | 10/2000 |
| JP | 2001-135021 A | 5/2001 |
| JP | 2001-167517 | 6/2001 |
| JP | 2001-189051 | 7/2001 |
| JP | 2001-243355 | 9/2001 |
| JP | 2001-256678 | 9/2001 |
| JP | 2001-332031 | 11/2001 |
| JP | 2001-344765 A | 12/2001 |
| JP | 2002-042347 | 2/2002 |
| JP | 2002-163857 | 6/2002 |
| JP | 2002 190159 | 7/2002 |
| JP | 2002-197674 | 7/2002 |
| JP | 2002-197789 | 7/2002 |
| JP | 2002-203369 | 7/2002 |
| JP | 2002-203374 A | 7/2002 |
| JP | 2002-216360 | 8/2002 |
| JP | 2002-304809 | 10/2002 |
| JP | 2002-311976 A | 10/2002 |
| JP | 2002-319245 | 10/2002 |
| JP | 2002-367281 | 12/2002 |
| JP | 2003-006997 | 1/2003 |
| KR | 2001-0051834 A | 6/2001 |
| KR | 10-2004-0048476 | 6/2004 |
| WO | WO 97/45836 | 12/1997 |
| WO | WO 00/21085 | 4/2000 |
| WO | WO 0103136 A2 | 1/2001 |
| WO | WO 02/15183 | 2/2002 |
| WO | WO 02/31821 A1 | 4/2002 |
| WO | WO 03003358 | 1/2003 |
| WO | WO 02/37493 | 6/2003 |
| WO | WO 2004/066286 | 8/2004 |
| WO | WO 2004/095439 | 11/2004 |

OTHER PUBLICATIONS

Office Action issued Nov. 14, 2008 by the U.S. Patent and Trademark Office in U.S. Appl. No. 10/762,536.

Office Action issued Feb. 27, 2009 by the USPTO in counterpart U.S. Appl. No. 10/762,535.

Office Action issued Feb. 26, 2009 by the USPTO in counterpart U.S. Appl. No. 10/516,910.

Office Action issued Jun. 16, 2009 by the Japanese Patent Office in JP 2006-500637.

Office Action for corresponding Chinese Application No. 200480000399.8 dated Sep. 1, 2006 and European Search Report and Supplementary European Search Report.

Supplement Search Report issued Jun. 12, 2006 by the European Patent Office in EP Patent Application No. 04703541.5-2210.

Search Report issued Sep. 22, 2006 by the European Patent Office in EP Patent Application No. 06001615.1-2223.

Supplemental Search Report issued Sep. 22, 2006 by the European Patent Office in EP Patent Application No. 04703531.6-2223.

Supplemental Search Report issued Nov. 24, 2006 by the European Patent Office in EP Patent Application No. 04705015.8-2223.

Office Action issued Oct. 29, 2007 by the European Patent Office in EP Patent Application No. 06 001 616.9-1232.

Search Report issued Nov. 7, 2007 by the European Patent Office in EP patent Application No. 07018289.4-1232.

Supplemental Search Report issued Apr. 2, 2008 by the European Patent Office in EP Patent Application No. 04703277.6-2223.
Office Action issued Mar. 12, 2008 by the European Patent Office in EP Patent Application No. 04 703 529.0-1232.
Search Report issued Mar. 26, 2008 by the European Patent Office in EP Patent Application No. 07018405.6-2223.
Search Report issued Apr. 28, 2004 in International Patent Application No. PCT/KR2004/000081.
Search Report issued May 6, 2004 in International Patent Application No. PCT/KR2004/000113.
Search Report issued May 18, 2004 in International Patent Application No. PCT/KR2004/000109.
Search Report issued May 18, 2004 in International Patent Application No. PCT/KR2004/000111.
Office Action issued Aug. 24, 2007 by the Japanese Patent Office in JP Patent Application No. 2006-500638.
Office Action issued Jan. 16, 2008 by the Japanese Patent Office in JP Patent Application No. 2006-076383.
Office Action issued Jan. 16, 2008 by the Japanese Patent Office in JP Patent Application No. 2006-076406.
Office Action issued Jan. 16, 2008 by the Japanese Patent Office in JP Patent Application No. 2006-500635.
Office Action issued Jan. 16, 2008 by the Japanese Patent Office in JP Patent Application No. 2006-500639.
Office Action issued Mar. 17, 2008 by the Japanese Patent Office in JP Patent Application No. 2006-500638.
Office Action issued Mar. 24, 2008 by the Japanese Patent Office in JP Patent Application No. 2006-500637.
Office Action issued Mar. 28, 2005 by the Korean Patent Office in KR Patent Application No. 10-2003-0004487.
Office Action issued Mar. 30, 2006 by the Korean Patent Office in KR Patent Application No. 10-2003-0004487.
Office Action Jan. 30, 2007 by the Russian Patent Office in RU Patent Application No. 2006109209/28(010015).
Office Action issued Jul. 10, 2007 by the Taiwanese Patent Office in TW Patent Application No. 095113498 (English language translation provided).
Office Action issued Apr. 11, 2007 by the USPTO in U.S. Appl. No. 10/762,535.
Office Action issued Apr. 17, 2007 by the USPTO in U.S. Appl. No. 10/762,538.
Office Action issued Jun. 12, 2007 by the USPTO in U.S. Appl. No. 10/762,536.
Office Action issued Oct. 9, 2007 by the USPTO in U.S. Appl. No. 10/762,516.
Office Action issued Nov. 15, 2007 by the USPTO in U.S. Appl. No. 10/762,535.
Office Action issued Nov. 19, 2007 by the USPTO in U.S. Appl. No. 10/762,536.
Office Action issued Jun. 6, 2008 by the USPTO in U.S. Appl. No. 10/762,535.
Office Action issued Jul. 31, 2008 by the USPTO in U.S. Appl. No. 10/898,040.
Office Action issued Aug. 26, 2008 by the Japanese Patent Office in counterpart Japanese Patent Application No. 2006-076406.
Office Action issued Jul. 4, 2008 by the Chinese Patent Office in counterpart Chinese Patent Application No. 200610059757.3 (with English language translation).
Office Action for corresponding Japanese patent application No. 2006-500635 dated Aug. 26, 2008.
Office Action issued Jul. 21, 2009 by the Japanese Patent Office in Japanese Application No. 2006-500631.
Office Action issued Jul. 14, 2009 by the Japanese Patent Office in Japanese Application No. 2008-319384.
Office Action issued Jul. 18, 2009 by the Korean Patent Office in Korean Application No. 10-2003-0005211.
European Office Action dated Dec. 14, 2009 for corresponding Application No. 06 001 614.4-2223.
Japanese Office Action dated Dec. 15, 2009 for corresponding Application No. 2008-319384.
Japanese Office Action dated Jan. 12, 2010 for corresponding Application No. 2007-243684.
Japanese Office Action dated Mar. 2, 2010 for corresponding Application No. 2006-076406.
Taiwanese Office Action dated Jan. 24, 2010 for corresponding Application No. 095114984.

* cited by examiner

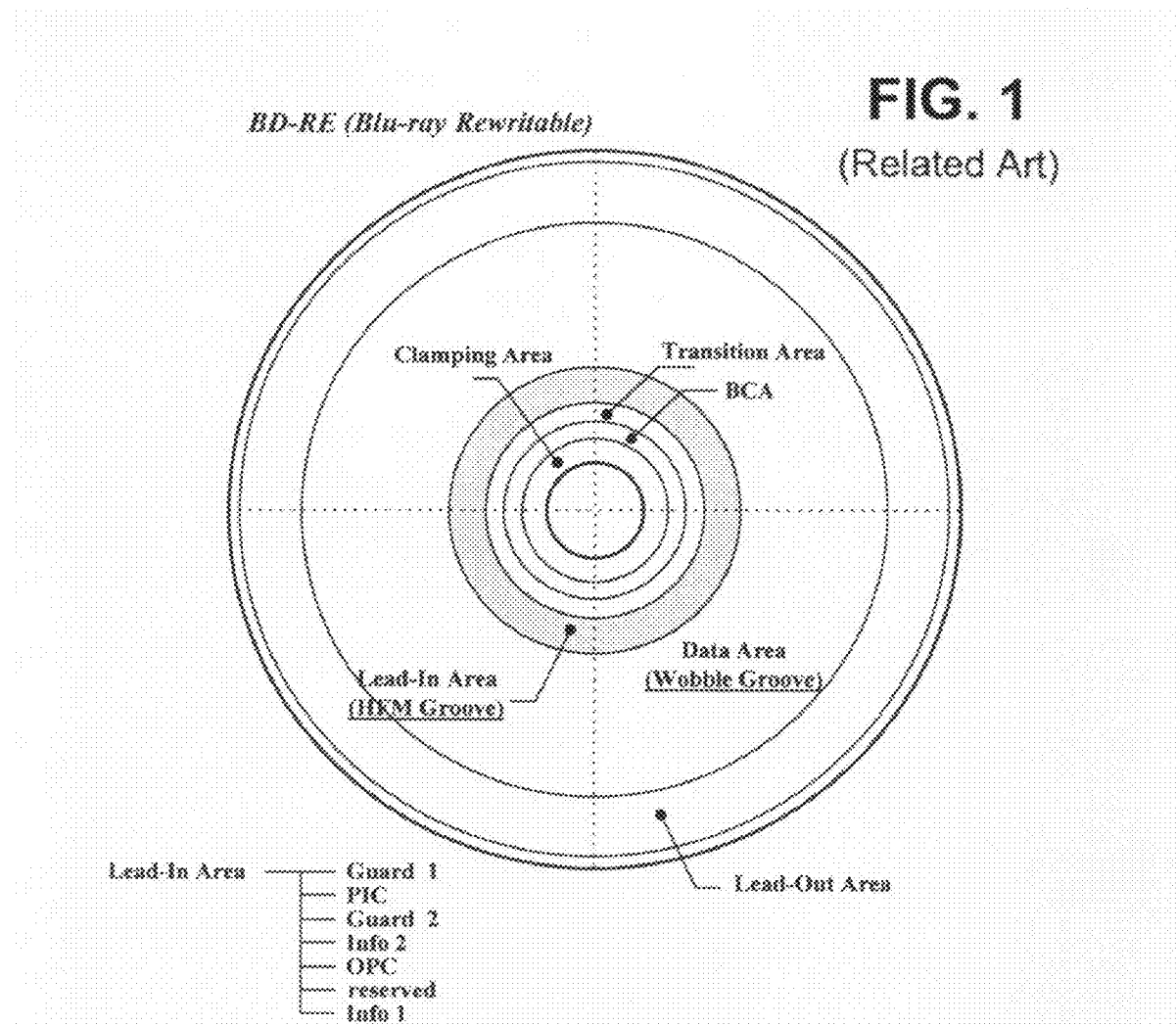
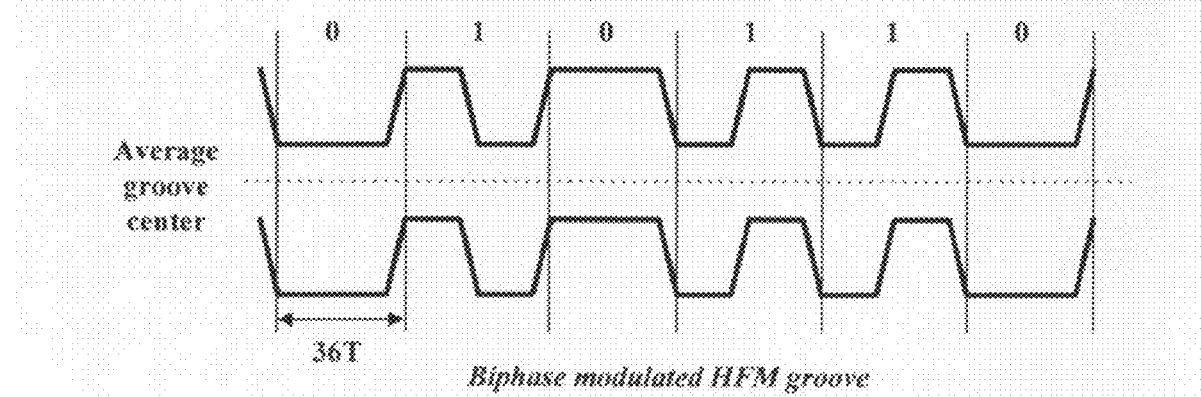

FIG. 5

| Byte number | Contents | number of bytes |
|---|---|---|
| 0 | Disc Information identifier = "DI" | 2 |
| 2 | DI format | 1 |
| 3 | Reserved = 00h | 1 |
| 4 | Number of DI frames in each DI Block | 1 |
| 5 | DI Frame sequence number in DI Block | 1 |
| 6 | Number of DI bytes in use in this DI Frame | 1 |
| 7 | Reserved = 00h | 1 |
| 8 to 10 | disc type identifier = "BDO" | 3 |
| 11 | disc size / version | 1 |
| 12 | disc structure | 1 |
| 13 | channel bit length | 1 |
| 14 to 15 | Reserved = all 00h | 2 |
| 16 | BCA descriptor | 1 |
| 17 | maximum transfer rate of application | 1 |
| 18 to 23 | Reserved = all 00h | 6 |
| 24 to 31 | Data zone allocation | 8 |
| 32 to 111 | Reserved = all 00h | 13 |

*where CPI_rec_Flag (1Byte) is allocated*

FIG. 6

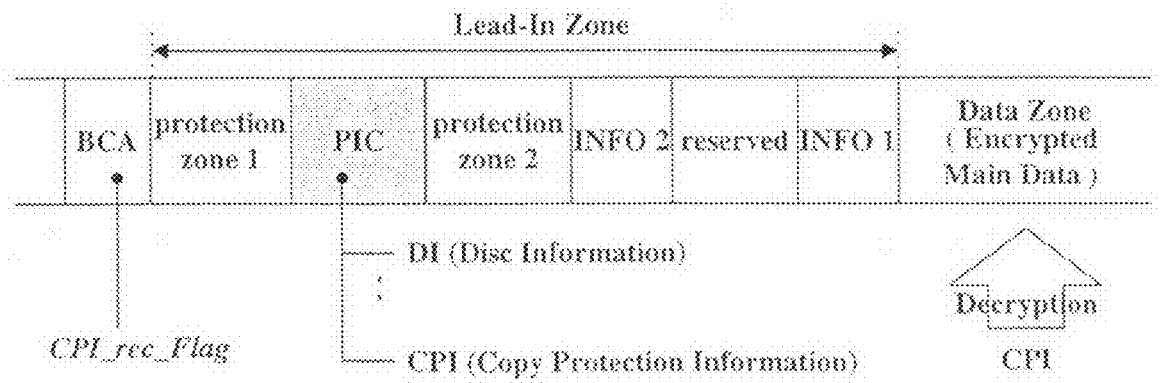

RECORDING MEDIUM WITH OPTIONAL INFORMATION AND APPARATUS AND METHODS FOR FORMING, RECORDING, REPRODUCING AND CONTROLLING REPRODUCTION OF THE RECORDING MEDIUM

CROSS-REFERENCE TO RELATED APPLICATIONS

This U.S. non-provisional application, is a continuation of, and claims priority to, pending application Ser. No. 10/762,535, filed Jan. 23, 2004, and claims priority of Korean Application No. 10-2003-0004488, filed on Jan. 23, 2003 and Korean Application No. 10-2003-0008317, filed on Feb. 10, 2003, both in the Korean Intellectual Property Office, the entire contents of all the above-referenced applications are hereby incorporated by reference.

BACKGROUND OF THE INVENTION

1. Field of the Invention

The present invention relates to a recording medium such as BD-ROM (Blu-ray Disc ROM), which includes an identification information, such as copy protection indicating information and an apparatus and methods for forming, recording, -reproducing, and controlling reproduction of the recording media.

2. Description of the Related Art

Recently, standardization of a new high-density optical disc, a rewritable Blu-ray disc (BD-RE: Blu-ray Disc-Rewritable), have been under development where large quantities of high quality video and audio data can be recorded. Once the standard of a BD-RE has been established, products adopting the new optical discs are expected to be commercially available in the near future.

As illustrated in FIG. 1, a BD-RE has an inner hole, clamping area, transition area, BCA (Burst Cutting Area) area, and lead-in area, located in sequential order along radial direction. A data area and lead-out area reside in the center and outermost annulus of the disc, respectively.

The lead-in area is partitioned into a first guard (Guard 1) area, PIC (Permanent Information & Control data) area, a second guard (Guard 2) area, Info 2 area, OPC (Optimum Power Calibration) area, etc. The first guard area and PIC area are pre-recorded areas, whereas the remaining lead-in areas, data area, and lead-out area correspond to rewritable areas which can be overwritten with new data.

General information of a disc which needs to be permanently preserved may be recorded in the PIC area, which can be encoded in wobbled grooves of a track by HFM (High Frequency Modulation) method. HFM Grooves may be modulated in the radial direction with a rather high bandwidth signal, to create a data channel for replicated information with sufficient capacity and data rate. As shown in FIG. 2, encoding data into wobbled groove can be performed by bi-phase modulation and thus recording.

In this modulation method, a bit with value 0 may be represented by a transition at the start of the bit cell and a bit with value 1 may be represented by a transition at the start and in the middle of the bit cell. The modulated bits may be recorded on the disc by a deviation of the groove from an average centerline as indicated in FIG. 2. The length of each bit cell may be 36T, where T corresponds to the length of a channel bit in the rewritable data areas.

Along with the development of a BD-RE, has been the development of a corresponding read-only disc, a read-only Blu-ray disc (hereinafter, referred to as 'BD-ROM'). As shown in FIG. 3, the BD-ROM disc may include an inner area, clamping area, transition area, information area, and rim area.

The main data of an audio/video (A/V) stream recorded in a data zone within an information area can be recorded with encryption with copy protection information (CPI) to prevent unauthorized copy.

Various disc information (DI) about the disc, such as the type of a disc, may be recorded in the PIC area within the information area. When encrypted main data are recorded in the data zone, copy protection information (CPI) for decryption can also be recorded in PIC area.

When an optical disc apparatus playing a recording medium performs initial servo operations in accordance with the insertion of a disc, copy protection information (CPI) recorded in the PIC area is detected. If main data recorded in a pre-recorded data area is found to be encrypted, the main data is output after decryption using the copy protection information.

Even when copy protection information is not recorded in the PIC area because the contents recorded in data area of a BD-ROM are not encrypted, an optical disc apparatus performing initial servo operations still performs a series of operations to detect copy protection information in the PIC area under the assumption that encryption has been applied to the contents. Such a preliminary operation can cause a delay in the playback of actual data. Also, if any data is recorded on the rewritable disk, i.e., BD-RE, or recordable disk, i.e., BD-WO and its data is copy protected, it may have the same problem when the data is reproduced.

Furthermore, if the copy protection information is not detected, it cannot distinguish whether there is no copy protection information initially because the disc is an illegal medium, or there is no copy protection information because the disc is legal and a copy-free medium.

SUMMARY OF THE INVENTION

In exemplary embodiments, the present invention is directed to a recording medium, such as a high-density and/or read-only recording medium, such as BD-ROM, which includes an indication information, which can identify whether an optional information, such as copy protection information, is needed or not for the playback of contents stored on the recording medium, and to methods and apparatuses for forming, recording, and reproducing data on the recording medium.

In exemplary embodiments, the present invention is directed to a recording medium, such as a high-density and/or read-only recording medium, such as BD-ROM, which includes information in a particular area indicating whether or not an optional information, such as copy protection information to reproduce recorded contents is present, and to methods and apparatuses for forming, recording, and reproducing data on the recording medium.

In exemplary embodiments, the present invention is directed to a recording medium, such as a high-density and/or read-only recording medium, such as BD-ROM, which includes information regarding the presence of an optional information, such as copy protection information in the disc information, and to methods and apparatuses for forming, recording, and reproducing data on the recording medium.

In exemplary embodiments, the present invention is directed to a recording medium, such as a high-density and/or read-only recording medium, such as BD-ROM, which includes information regarding the presence of an optional information, such as copy protection information as header information of a copy protection information field, and to methods and apparatuses for forming, recording, and reproducing data on the recording medium.

In exemplary embodiments, the present invention is directed to a recording medium, such as a high-density and/or read-only recording medium, such as BD-ROM, which includes an indication information, such as copy protection indicating information, which is used to determine whether an optional information, such as copy protection information, is present and whether decoding is necessary, and to methods and apparatuses for forming, recording, and reproducing data on the recording medium.

In exemplary embodiments, the present invention is directed to a recording medium, such as a high-density and/or read-only recording medium, such as BD-ROM, which includes an identification information, such as copy protection indicating information, which is used to determine whether an optional information, such as copy protection information, is present and whether decoding is necessary, playback of contents is directly started, irrespective of whether or not recorded contents have been encoded, and to methods and apparatuses for forming, recording, and reproducing data on the recording medium.

In exemplary embodiments, the present invention is directed to a recording medium, such as a high-density and/or read-only recording medium, such as BD-ROM, which includes recorded data, comprising an information area, the information area including a first region for the recorded data, a second region for optional information which when present, controls recording or reproduction of the recorded data, and a third region for information identifying the presence or absence of the optional information; said optional information and/or said information identifying the presence or absence of said optional information being encoded in wobbled pits.

In exemplary embodiments, the present invention is directed to a method for forming data recorded on a recording medium, such as a high-density and/or read-only recording medium, such as BD-ROM, which includes forming a recording medium, comprising forming a first region for storing recorded data; forming a second region for optional information which when present, controls recording or reproduction of the recorded data; forming a third region for information identifying the presence or absence of the optional information; and encoding the optional information and/or the information identifying the presence or absence of the optional information in wobbled pits.

In exemplary embodiments, the present invention is directed to a method for reproducing data recorded on a recording medium, such as a high-density and/or read-only recording medium, such as BD-ROM, which includes utilizing optional information which when present, controls recording or reproduction of the recorded data, and/or information identifying the presence or absence of the optional information, to reproduce the data; the optional information and/or the information identifying the presence or absence of the optional information being encoded in wobbled pits.

In exemplary embodiments, the present invention is directed to a method for recording data recorded on a recording medium, such as a high-density and/or read-only recording medium, such as BD-ROM, which includes optionally recording optional information which when present, controls recording or reproduction of the recorded data, and recording the optional information and/or information identifying the presence or absence of the optional information in wobbled pits.

In exemplary embodiments, the present invention is directed to an apparatus for reproducing data recorded on a recording medium, such as a high-density and/or read-only recording medium, such as BD-ROM, wherein said apparatus utilizes optional information which when present, controls recording or reproduction of the recorded data, and/or information identifying the presence or absence of the optional information, to reproduce the data, the optional information and/or the information identifying the presence or absence of the optional information being encoded in wobbled pits.

BRIEF DESCRIPTION OF THE DRAWINGS

The accompanying drawings, which are included to provide a further understanding of the invention, illustrate exemplary embodiments of the invention, and together with the description, serve to explain the principles of the present invention.

In the drawings:

FIG. 1 is a diagram illustrating the disc structure of a conventional rewritable Blu-ray disc (BD-RE);

FIG. 2 is a diagram illustrating the high frequency modulation (HFM) groove formed in the PIC area of a rewritable Blu-ray disc;

FIG. 5 is a diagram illustrating the fields of disc information recorded and managed in a high-density Blu-ray disc, wherein a flag indicating the presence of copy protection information is included in an exemplary embodiment of the present invention;

FIG. 6 is a diagram illustrating an exemplary embodiment wherein recorded in the BCA area of a Blu-ray disc according to the present invention is information indicating whether or not copy protection information is recorded;

DETAILED DESCRIPTION OF EXEMPLARY EMBODIMENTS

Hereinafter, a high-density read-only recording medium according to exemplary embodiments of the present invention and exemplary embodiments of apparatuses and methods for forming, recording, and reproducing copy protection information will be described in detail with reference to the appended drawings.

Figure 3:
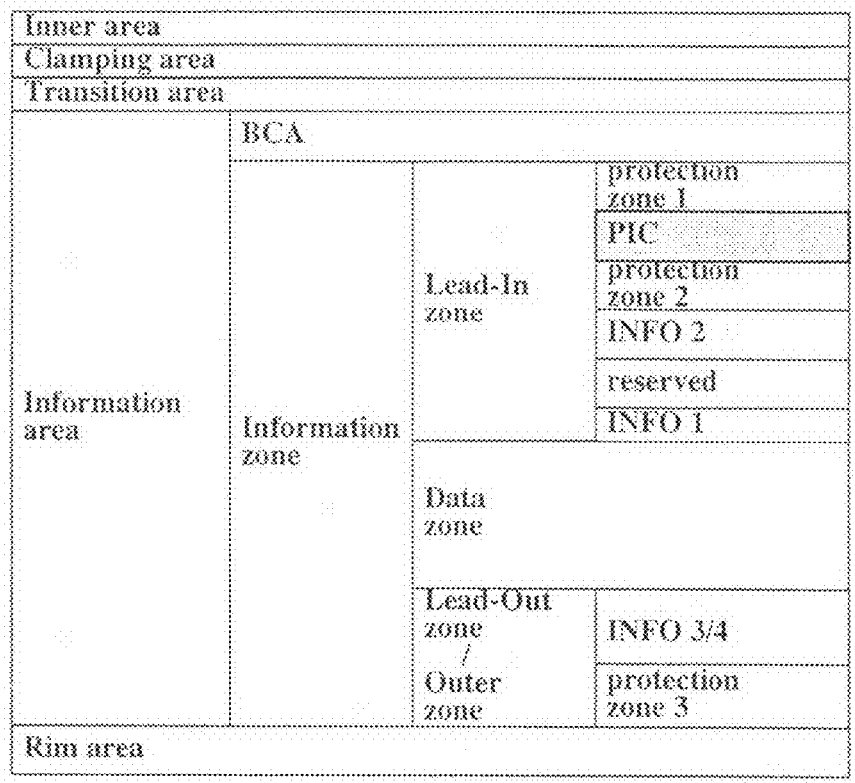
FIG. 3 is a diagram illustrating each area allocated in a read-only Blu-ray disc (BD-ROM) in an exemplary embodiment of the present invention.

As stated above with reference to FIG. 3, a read-only Blu-ray disc (BD-ROM) according to exemplary embodiments of the present invention has a disc structure including inner area, clamping area, transition area, information area, and rim area.

Figure 4:
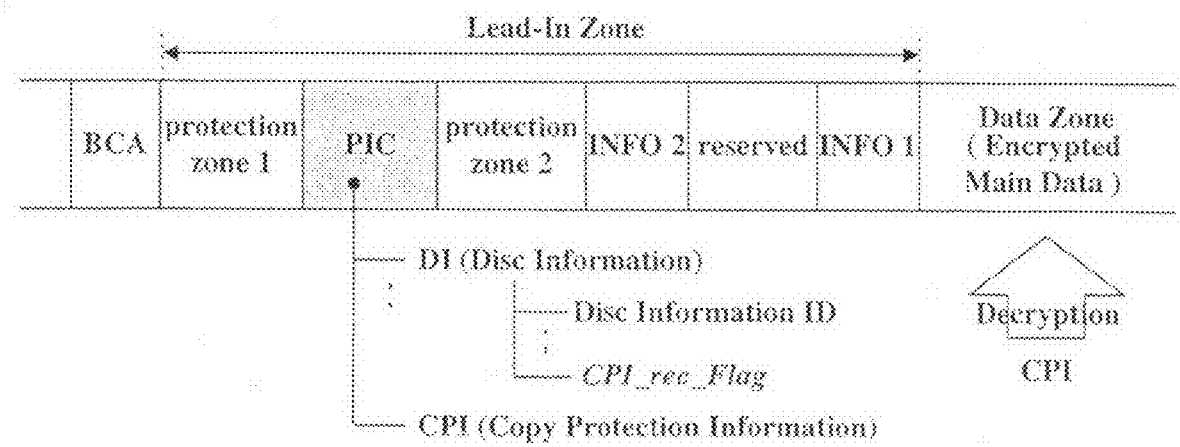
FIG. 4 is a diagram illustrating an exemplary embodiment wherein information regarding the presence of copy protection information is recorded in the PIC area of a Blu-ray disc according to an exemplary embodiment of the present invention.

As shown in FIG. 4, disc information corresponding to general information of a disc as well as encrypted main data recorded in data zone, for example, copy protection information required to decrypt A/V data streams may be recorded in the PIC area allocated in the information area.

When the main data is recorded without encryption in the data zone, the copy protection information need not be particularly recorded in the PIC area.

Accordingly, a flag to indicate whether or not copy protection information is recorded in the PIC area may be included in the disc information recorded in the PIC area. The flag (CPI_rec_Flag) indicates the presence of copy protection information and may have a recording size of one byte.

As shown in FIG. 5, one byte is allocated to record the flag indicating the presence of copy protection information within the area reserved for the disc information.

Also, the disc information in the PIC area can be recorded for several times. The flag byte may be recorded only in the first disc information among multiple of disc information which are recorded repeatedly in the PIC area.

As illustrated in FIG. 6, the flag indicating whether or not the copy protection information is recorded may be recorded in another area, e.g., the BCA (Burst Cutting Area) area allocated in the inner ring of the PIC area wherein copy protection information is recorded.

Copy protection information, along with the flag indicating the presence thereof, may be encoded and recorded in wobbled pits rather than in straight pits where data are recorded in general case. To this purpose, pits may be formed in wobbled pattern (or in a zigzag pattern) within as many track sections as needed. Also, it may be encoded and recorded in wobbled pits and straight pits alternatively and/or intermittently within the PIC area. Otherwise, it may be selectively or repeatedly recorded on other area except for the PIC area. It may be recorded by an HEM groove wobbled method such as is used for BD-RE. The copy protection information may include a key value for encrypting the main data to be recorded on data area.

Figure 7:
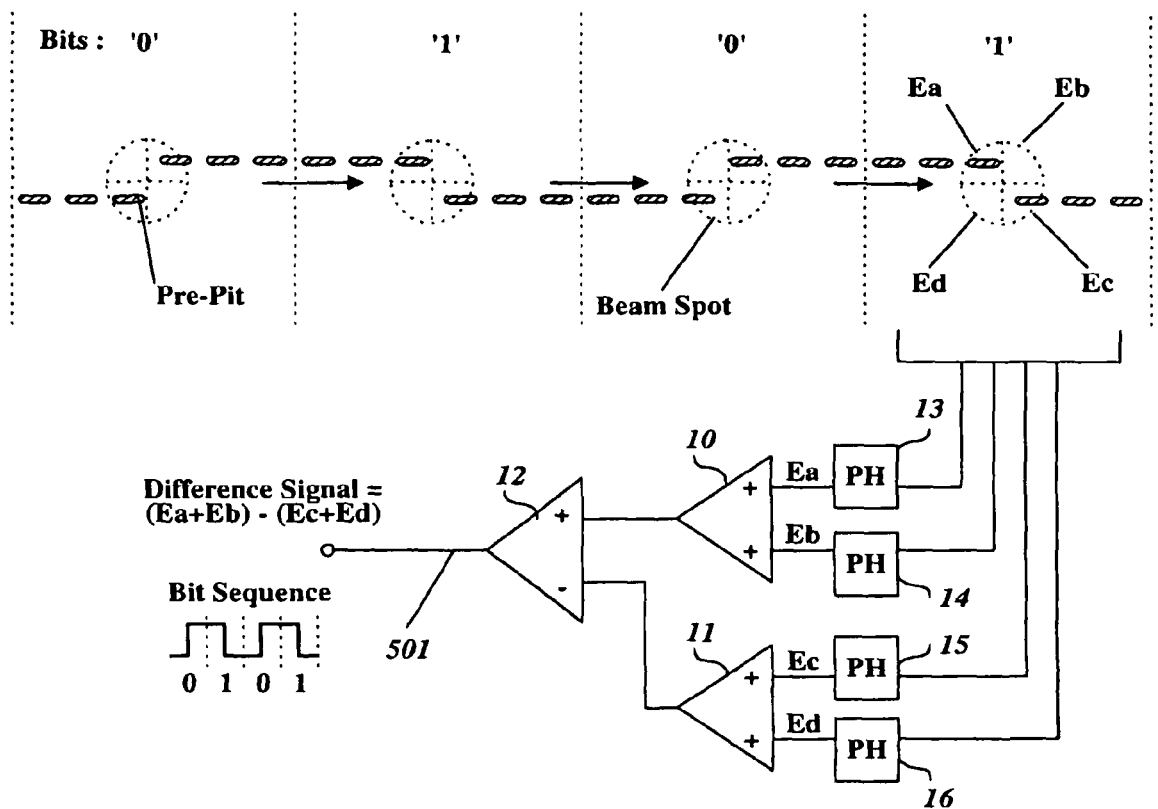
FIG. 7 is a diagram illustrating a process restoring data encoded in wobbled pits according to an exemplary embodiment of the present invention.

FIG. 7 is a diagram illustrating an example where data is encoded in wobbled pits by bi-phase modulation, whereby data are detected. In FIG. 7, the value of '0101' is encoded in bi-phase modulated form, e.g., bi-phase modulated HFM Groove, along with wobbled pattern of wobbled pits. The recording example of wobbled pits in FIG. 7 comprises 36Ts (including marks and spaces) where six 3T signals (mark) make up of the value of one bit. In the example, left and right transition of a sequence of six pits denoting '1' and a sequence of six pits denoting '0' are provided in opposite directions.

As shown in FIG. 7. the structure by bi-phase modulation is different from the structure illustrated in FIG. 2. That is, the method of FIG. 2 has a bit with value 0, which is represented by a transition at the start of the bit cell and a bit with value 1, which is represented by a transition at the start and in the middle of the bit cell. Otherwise, the method of FIG. 7 has a bit with value 0, which is represented by a transition at the start of low and in the middle of high, and a bit with value 1, which is represented by the transition in the opposite direction. The combination of bits consists of data to detect information recorded as wobbled pit. The wobbled pit can be copy protection information, i.e., key data to decrypt main data recorded on the data zone of the recording medium as shown in FIG. 4A to 4F That is, the wobbled pit data can be reproduced or detected only when the bi-phased modulation data is detected or reproduced normally. And also, reproduction or decryption of main data is possible only when the wobbled pit data for copy protection is reproduced or detected using the normally detected or reproduced bi-phase modulation data.

When information is recorded in pits, identical pits need not be repeated but modulated varying pits (2T-8T) in accordance with input information may be recorded. In this case, too, however, the position of a pit sequence (namely, phase) is shifted approximately by every 18Ts in order to encode data into wobbled pattern of wobbled pits.

The reflected light reflected from wobbled pits recorded in such a manner undergoes a photoelectric transform by four quadrant light receiving elements 13-16.

As illustrated in FIG. 7, THE photoelectrically transformed electrical signals (Ea, Eb, Ec, Ed) are amplified by a circuit for conventional push-pull track control. More specifically, left and right-side signals of the track (Ea+Eb, Ec+Ed) are amplified by respective amplifiers 10, 11 and the difference signal 501 of the left and right-side signals ((Ea+Eb)−(Ec+Ed)) is output by a differential amplifier 12. When the difference signal 501 is converted a binary signal based on whether its level is above or below a reference, encoded data in wobbled pattern of wobbled pits may be obtained.

Because signals detected from the wobbled pattern of wobbled pits are not available externally, even if data played from a BD-ROM were copied onto another recording medium other than the BD-ROM, playback of the copied data would be impossible.

Instead of recording data in wobbled pattern, if data were recorded in the PIC area according to a different agreement for recording format between manufactures having legal authorities, copying a BD-ROM by unauthorized manufactures can also be made more difficult.

Figure 8:
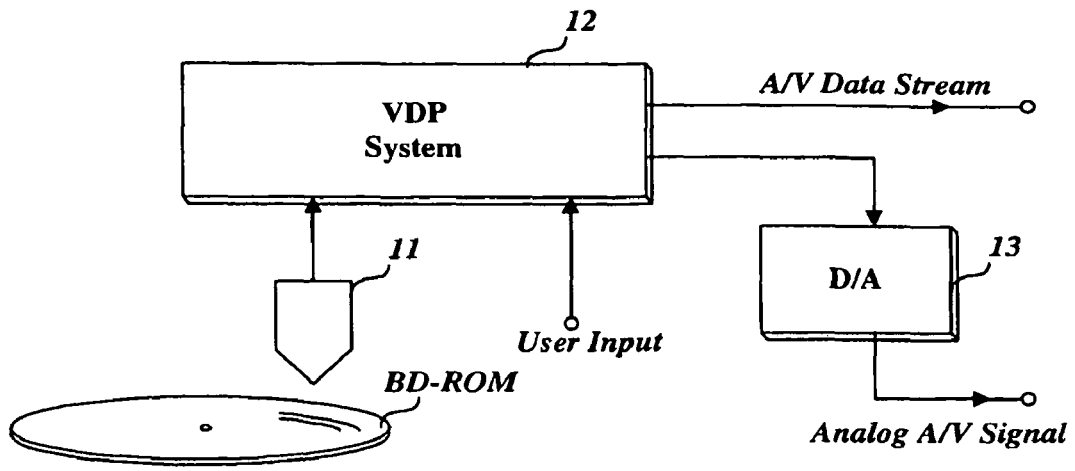
FIG. 8 is a diagram illustrating a simplified structure of an optical disc apparatus capable of playing a high-density Blu-ray disc in accordance with an exemplary embodiment of the present invention.
Figure 9:
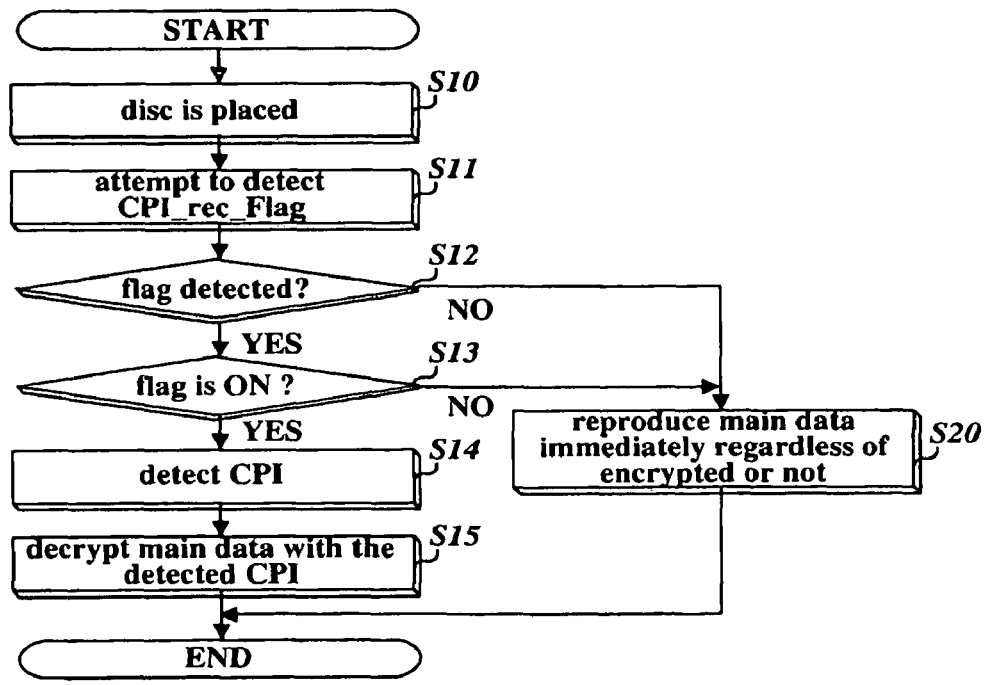
FIG. 9 is a flowchart illustrating the process of playing a high-density Blu-ray optical disc according to an exemplary embodiment of the present invention.

FIG. 8 is a simplified diagram illustrating an optical disc apparatus playing a recording medium of a disc. The apparatus includes an optical pickup 11; VDP (Video Disc Play) system 12 performing signal processing and servo control; and a D/A converter 13. The optical disc apparatus may perform playback processing according to whether or not copy protection information is recorded, as described in conjunction with FIG. 9.

The VDP system 12 of the disc apparatus detects and checks a flag (CPI_rec_Flag) indicating whether or not copy protection information among disc information recorded in the PIC area or encoded in the wobbled pits of an inserted BD-ROM is recorded (S11); otherwise, a flag recorded in the BCA area of a BD-ROM is detected (S11), whereby it is determined whether or not copy protection information is recorded.

If the flag is detected, its value is checked (S13). If the value indicates that copy protection information is recorded, the VDP system 12 of the optical disc apparatus performs (S14) the operation of detecting copy protection information recorded in the PIC area or encoded in the wobbled pits; thereafter, by using the copy protection information, a series of data play operations decrypting and playing encrypted data recorded in the data zone are performed (S15).

When the value of the flag indicates the absence of copy protection information or the flag indicating the presence of copy protection information is not detected, the VDP system 12 omits unnecessary operations to detect non-existent copy protection information in the PIC area, but directly performs the operations of reading out recorded contents in the data area.

As shown in the exemplary embodiment of FIG. 5, the flag indicating whether or not copy protection information is recorded, instead of being included and recorded in the disc information, may be recorded in the PIC area together with copy protection information.

Figure 10:
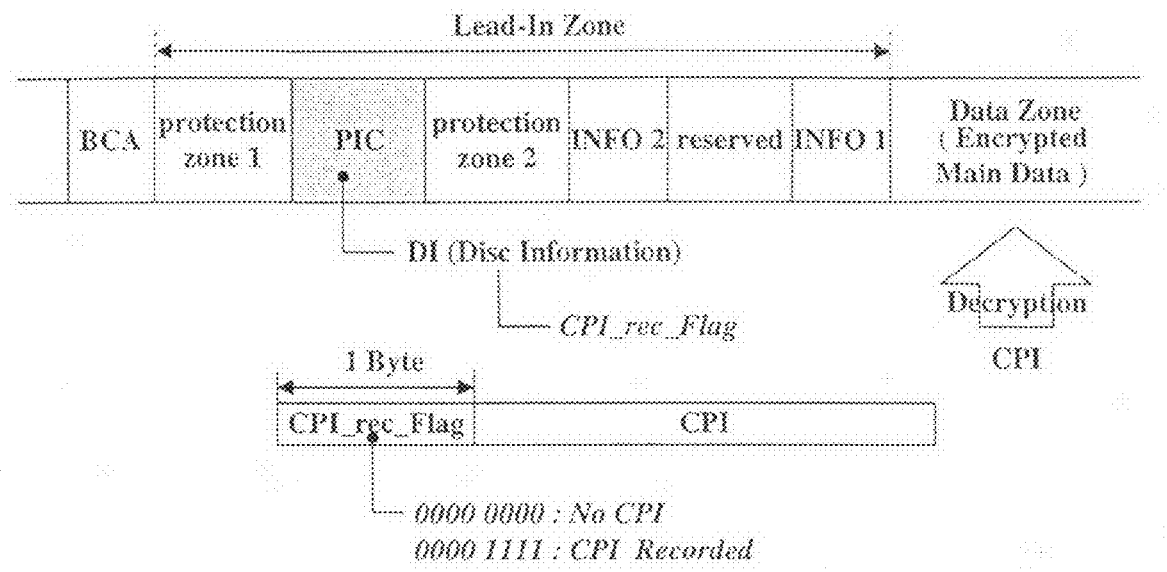
FIGS. 10 and 11 are diagrams illustrating respectively the exemplary embodiments according to the present invention, wherein recorded in a Blu-ray disc are information indicating whether or not copy protection information is recorded.

FIG. 10 is an exemplary embodiment illustrating such an arrangement. As shown in the exemplary embodiment of FIG. 10, the flag (CPI_rec_Flag) indicating the presence of copy protection information may be recorded as header information of copy protection information field.

The flag indicating whether or not copy protection information is recorded may have a recording size of one byte. When the value of the flag is '0000 0000', the flag indicates that copy protection information is not recorded (in this case, a succeeding copy protection information field may be filled with '00'.) When the value of the flag is '0000 1111', the flag indicates that copy protection information is recorded.

In other exemplary embodiments, copy protection information having a flag indicating whether or not copy protection information is recorded as a header information can be recorded in a particular recording area other than the PIC area, for example, the BCA area.

Copy protection information having a flag indicating whether or not copy protection information is recorded can be recorded in a field of disc information stored in the PIC area. Alternatively, it may be recorded as an independent structure from the disc information.

Figure 11:
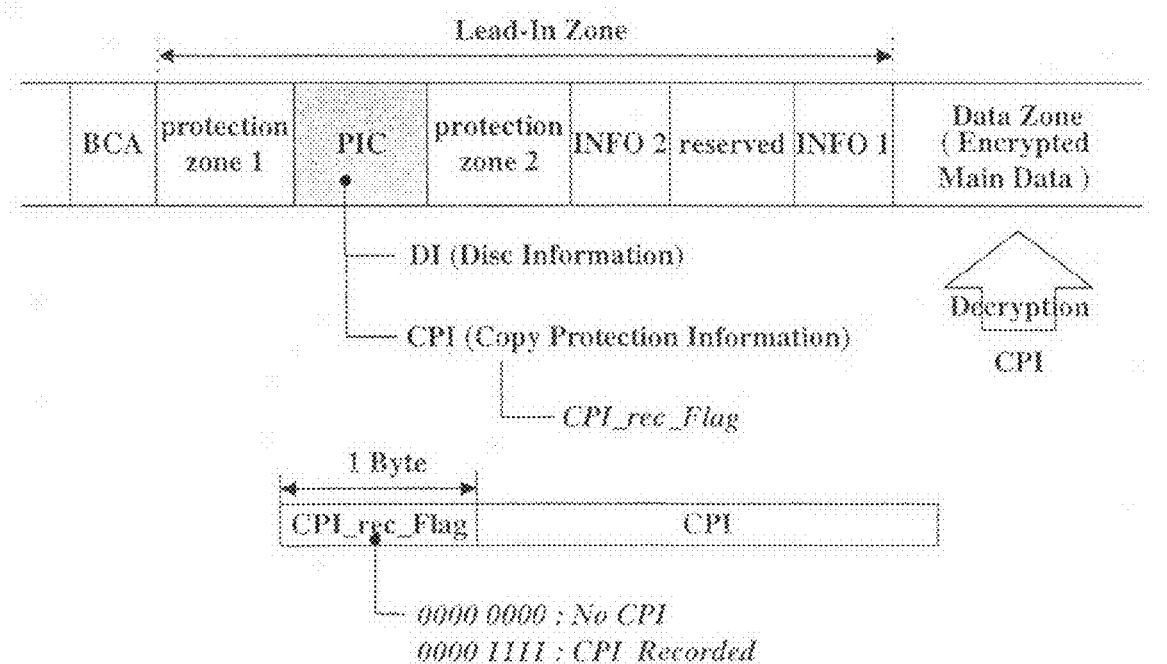

FIG. 11 describes an exemplary embodiment wherein copy protection information is recorded in the PIC area independently of the disc information.

In the exemplary embodiment of FIG. 11, the flag indicating whether or not copy protection information is recorded also appears in the header of copy protection information. When the value of the flag is '0000 0000', the flag indicates that copy protection information is not recorded (In this case, succeeding copy protection information field may be filled with the value of '00'.) When the value of the flag is '0000 1111', the flag indicates that copy protection information is recorded.

As described above, a high-density read-only recording medium and methods for recording copy protection information/playing thereof according to exemplary embodiments of the present invention allows a direct playback of contents stored in a high-density read-only disc unless the contents had been encrypted, whereas proper playback is achieved by reading out decryption information from the disc when encryption has been applied to the contents.

In addition, information for decoding encrypted data is recorded in a form of copy-resistant wobbled pits, whereby illegal copy of the contents stored in a high-density read-only disc is prohibited.

Although exemplary embodiments of the present invention have been described in conjunction with a high-density, read-only recording medium, the teachings of the present invention are also applicable to other recording media, such as recordable, rewritable, or rewritable once media and methods and apparatuses associated therewith, as would be known to one of ordinary skill in the art.

The foregoing description of exemplary embodiments of the present invention has been presented for purposes of illustration; therefore, those skilled in the art may utilize the invention and various embodiments with improvements, modifications, substitutions, or additions within the spirit and scope of the invention as defined by the following appended claims.

What is claimed is:

1. A computer-readable storage medium, comprising:
    a data zone for main data; and
    a lead-in zone including an area where wobble pits in which control information is recorded are formed, the control information required to record or reproduce the main data,
    wherein second control information required to reproduce the control information or the main data is encoded along with a wobble pattern of the wobbled pits by a bi-phase modulation method in such a manner that bit 0 and bit 1 are determined respectively depending on a direction of a transition of the wobble pattern within a predetermined period.

2. The storage medium according to claim 1, wherein the control information is recorded in a permanent information & control (PIC) data area of the lead-in zone.

3. The storage medium according to claim 1, wherein one of the bit 1 and the bit 0 is represented by only one transition from low to high in a middle within the predetermined period, while another one is represented by only one transition to an opposite direction in the middle of the predetermined period.

4. The storage medium according to claim 1, wherein the control information is recorded in a permanent information & control (PIC) data area of the lead-in zone as part of disc information or independent of the disc information.

5. The storage medium according to claim 1, further comprising:
    a third region for storing identification information to identify the presence or absence of the control information, the identification information being encoded in a wobbled pattern by a bi-phase modulation method.

6. The storage medium according to claim 1, wherein the control information is reproducible only when the second control information is detected normally.

7. The storage medium according to claim 1, wherein the main data is reproducible only when the control information is reproduced by the second control information.

8. A method of reproducing data from a recording medium, comprising:
    reading control information required to record or reproduce main data from a lead-in zone, the control information being recorded in wobbled pits, while detecting second control information encoded along with a wobbled pattern of the wobbled pits by a bi-phase modulation in such a manner that that bit 0 and bit 1 are determined respectively depending on a direction of a transition of the wobble pattern within a predetermined period, the second control information being required to reproduce the control information or the main data; and
    decoding the control information using the detected second control information to reproduce the main data.

9. The method according to claim 8, wherein the control information is recorded in a permanent information & control (PIC) data area of the lead-in zone.

10. The method according to claim 8, wherein one of the bit 1 and the bit 0 is represented by only one transition from low to high in a middle within the predetermined period, while another one is represented by only one transition to an opposite direction in the middle within the predetermined period, and
    wherein the detecting second control information detects the bit 0 or 1 by identifying the transition direction.

11. The method according to claim 8, wherein the control information is recorded in a permanent information & control (PIC) data area of the lead-in zone as part of disc information or independent of the disc information.

12. The method according to claim 8, further comprising:
detecting a presence of absence of the control information based on identification information, the identification information being encoded in wobbled pattern by bi-phase modulation.

13. The method according to claim 8, wherein the control information is reproducible only when the second control information is detected normally.

14. The method according to claim 8, wherein the main data is reproducible only when the control information is reproduced by the second control information.

15. An apparatus for reproducing data from a recording medium, comprising:
a signal detector configured to read control information required to record or reproduce main data from a lead-in zone, the control information being recorded in wobbled pits, wherein the signal detector is further configured to detect second control information encoded along with a wobbled pattern by a bi-phase modulation method in such a manner that bit 0 and bit 1 are determined respectively depending on a direction of a transition of the wobble pits within a predetermined period, the second control information being required to reproduce the control information or the main data; and
a signal processor, coupled to the signal detector, to decode the control information using the detected second control information.

16. The apparatus according to claim 15, wherein the control information is recorded in a permanent information & control (PIC) data area of the lead-in zone, and
wherein the signal detector detects the control information in the PIC area.

17. The apparatus according to claim 15, wherein one of the bit 1 and the bit 0 is represented by only one transition from low to high in a middle within the predetermined period, while another one is represented by only one transition to an opposite direction in the middle of the predetermined period, and
wherein the signal processor decodes the bit 0 or 1 by identifying the transition direction.

18. The apparatus according to claim 15, wherein the control information is recorded in a permanent information & control (PIC) data area as part of disc information or independent of the disc information.

19. The apparatus according to claim 15, wherein the signal processor identifies a presence of absence of the control information based on identification information, the identification information being encoded in a wobbled pattern by a bi-phase modulation.

20. The apparatus according to claim 15, wherein the control information is reproducible only when the second control information is detected normally.

21. The apparatus according to claim 15, wherein the main data is reproducible only when the control information is reproduced by the second control information.

* * * * *